United States Patent
Lin et al.

(12)
(10) Patent No.: US 6,335,598 B1
(45) Date of Patent: Jan. 1, 2002

(54) DC BRUSHLESS MOTOR SYSTEM WITH CAPACITORS

(75) Inventors: Chi-Cheng Lin; Ching-Hung Lin; Shun-Yi Tung, all of Taoyuan (TW)

(73) Assignee: Acer Communication and Multimedia Inc., Taoyuan (TW)

( * ) Notice: Subject to any disclaimer, the term of this patent is extended or adjusted under 35 U.S.C. 154(b) by 0 days.

(21) Appl. No.: 09/546,321

(22) Filed: Apr. 7, 2000

(30) Foreign Application Priority Data

Dec. 10, 1999 (TW) ........................................ 88121635 A (51) Int. Cl.⁷ ................................................ H02P 6/16
(52) U.S. Cl. ........................ 318/254; 318/439; 318/721
(58) Field of Search .................................. 318/138, 254, 318/439, 720, 721, 724

(56) References Cited

U.S. PATENT DOCUMENTS 4,030,005 A * 6/1977 Doemen ...................... 318/138
4,230,976 A * 10/1980 Muller ......................... 318/138
4,473,782 A * 9/1984 Reinhardt et al. ........... 318/254
4,724,365 A * 2/1988 Muller ......................... 318/254

* cited by examiner

Primary Examiner—Bentsu Ro
(74) Attorney, Agent, or Firm—Winston Hsu (57) ABSTRACT

The present invention relates to a brushless motor system. The brushless motor system has a brushless motor, a motor driver, and at least one sensing circuit. The brushless motor has a rotor, and the sensing circuit is used to detect the rotor position. The sensing circuit has a Hall sensor and two capacitor devices. The Hall sensor has two output ports. As the rotor rotates, the Hall sensor will generate a sensing signal at each of the two output ports. Each of the capacitor devices is connected in series to one of the two output ports of the Hall sensor, and the two capacitor devices are used to filter out DC biases in the two sensing signals. The motor driver is connected to the two capacitor devices for driving the rotor of the brushless motor according to the two sensing signals from the two capacitor devices.

11 Claims, 6 Drawing Sheets

DC BRUSHLESS MOTOR SYSTEM WITH CAPACITORS

BACKGROUND OF THE INVENTION

1. Field of the Invention

The present invention relates to a brushless motor system, and more particularly, to a brushless motor system with capacitors.

2. Description of the Prior Art

DC brushless motors are widely used due to their simplicity of design, durability and efficiency. Many of the motors used in computer storage devices, such as the spindle motors of hard disk, CD-ROM, CD-RW and DVD devices, all employ DC brushless motor technology. As computing speeds grow, so, too, does the demand for faster access times of computer storage devices. This places greater demands of speed and stability on the spindle motors of these devices. Therefore, controlling a spindle motor to make it both fast and stable has become an important subject in the field of storage device design.

Figure 1:
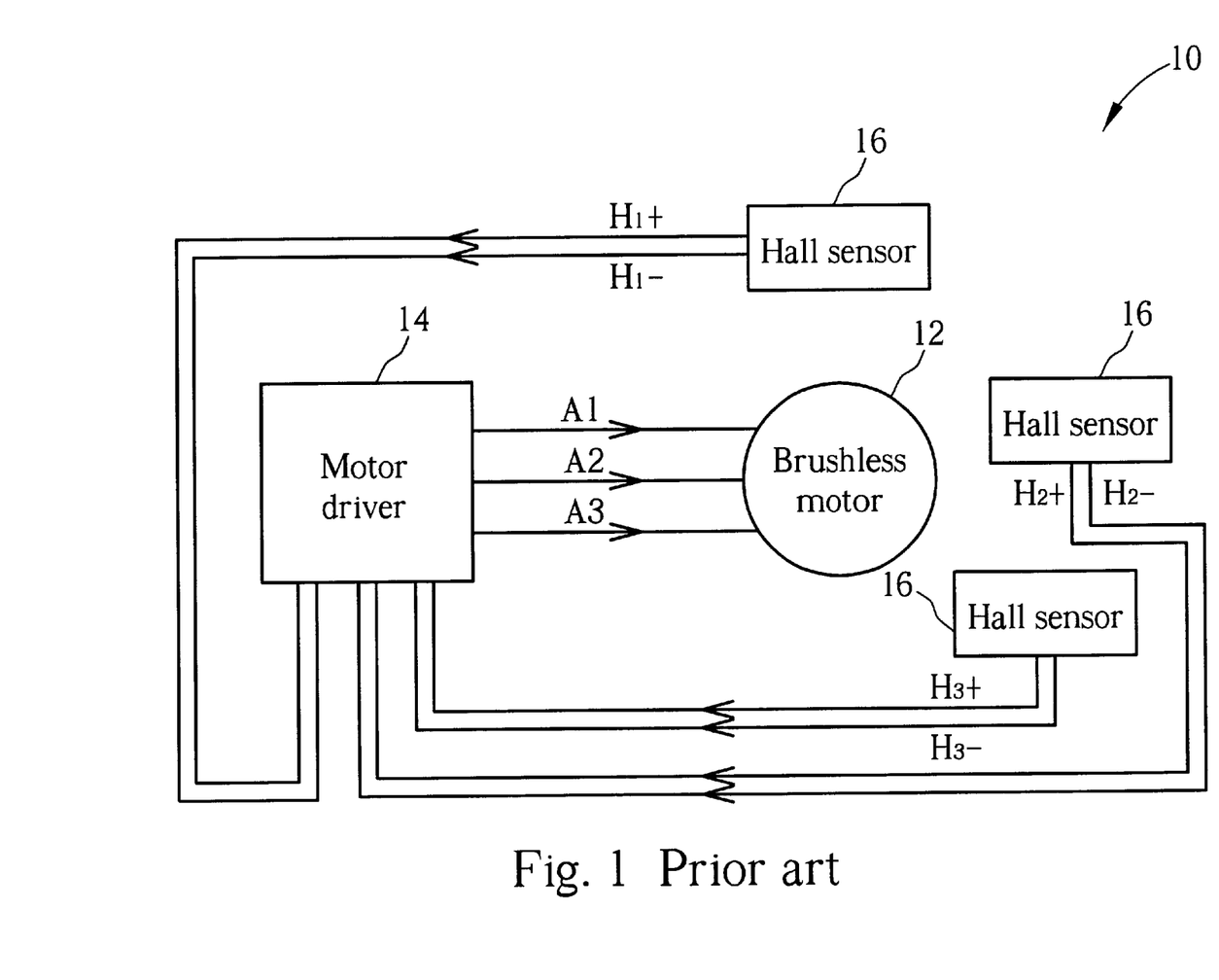
FIG. 1 is a schematic diagram of a prior art brushless motor system.

Please refer to FIG. 1. FIG. 1 is a schematic diagram of a prior art brushless motor system 10. The prior art brushless motor system 10 comprises a 3-phase brushless motor 12, a driver 14, and three Hall sensors 16. The brushless motor 12 comprises a rotor (not shown). The Hall sensors 16 are used to detect the rotor position. The driver 14 drives the rotor of the brushless motor 12 based upon the rotor position as detected by the Hall sensors 16.

As the rotor rotates, each of the Hall sensors 16 generates and sends two corresponding sensing signals to the driver 14. The sensing signals generated by the three Hall sensors 16 are denoted as H1+, H1−, H2+, H2−, H3+, and H3−. The driver 14 outputs 3 phase currents A1, A2, and A3 to drive the brushless motor 12 based upon the sensing signals generated by the three Hall sensors 16.

Figure 2:
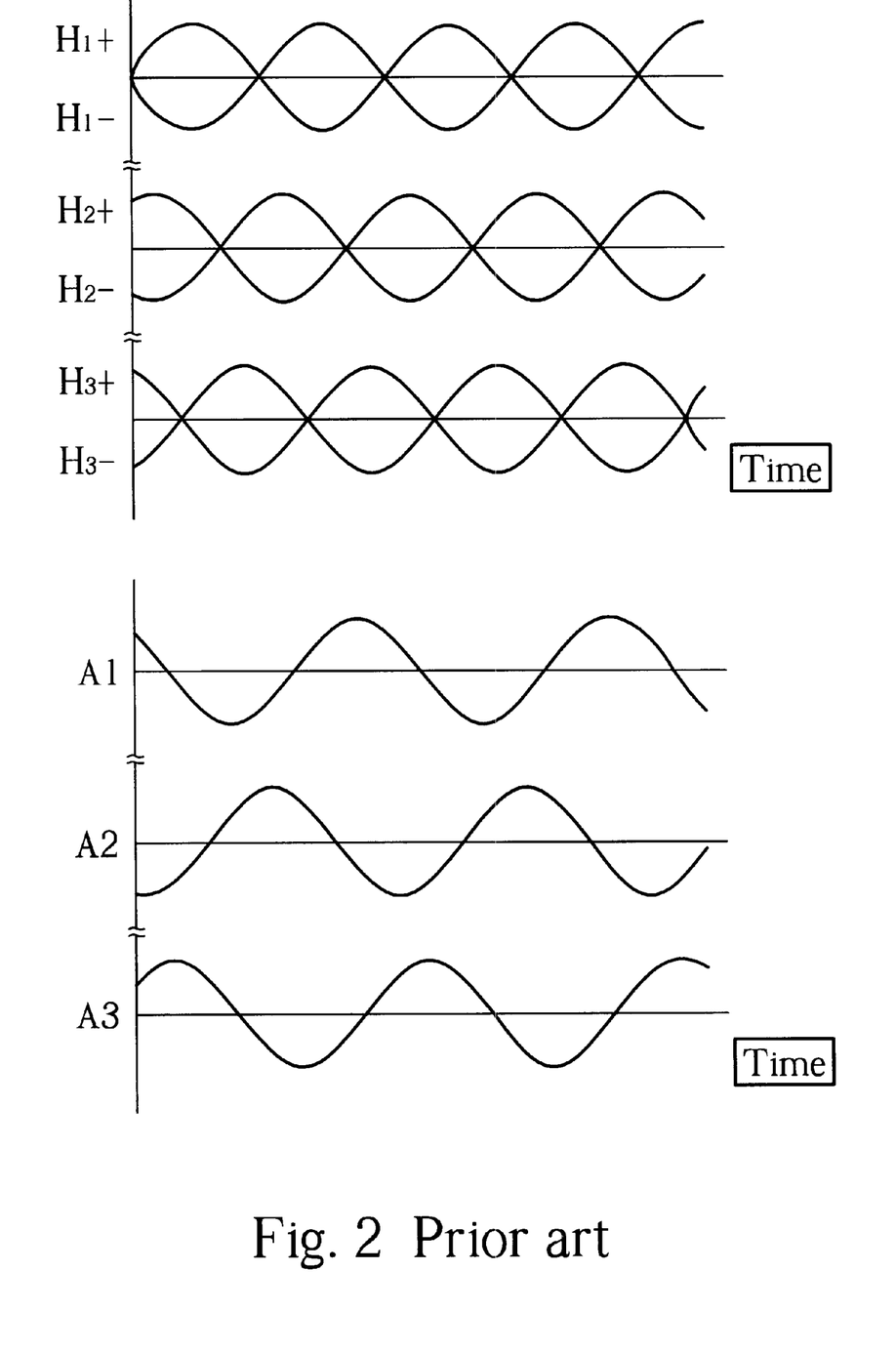
FIG. 2 is an ideal time sequence diagram of sensing signals and phase currents.

Please refer to FIG. 2. FIG. 2 is an ideal time sequence diagram of the sensing signals H1+, H1−, H2+, H2−, H3+, H3− and the 3 phase currents A1, A2, and A3. As the rotor rotates, the sensing signals H1+, H1−, H2+, H2−, H3+, and H3−, which have the same wave shape but with different phases, are generated by the Hall sensors 16. The corresponding 3 phase currents A1, A2, and A3, which also have the same wave shape but with different phases, are generated by the driver 14 according to these sensing signals. Ideally, the two sensing signals generated by the same Hall sensor 16 should have the same DC bias and should be symmetrical with respect to each other. Under these ideal conditions, the driver 14 should generate the correct 3 phase currents A1, A2, and A3, with no DC biases, based upon these ideal sensing signals, resulting in the smooth operation of the brushless motor 12.

Figure 3:
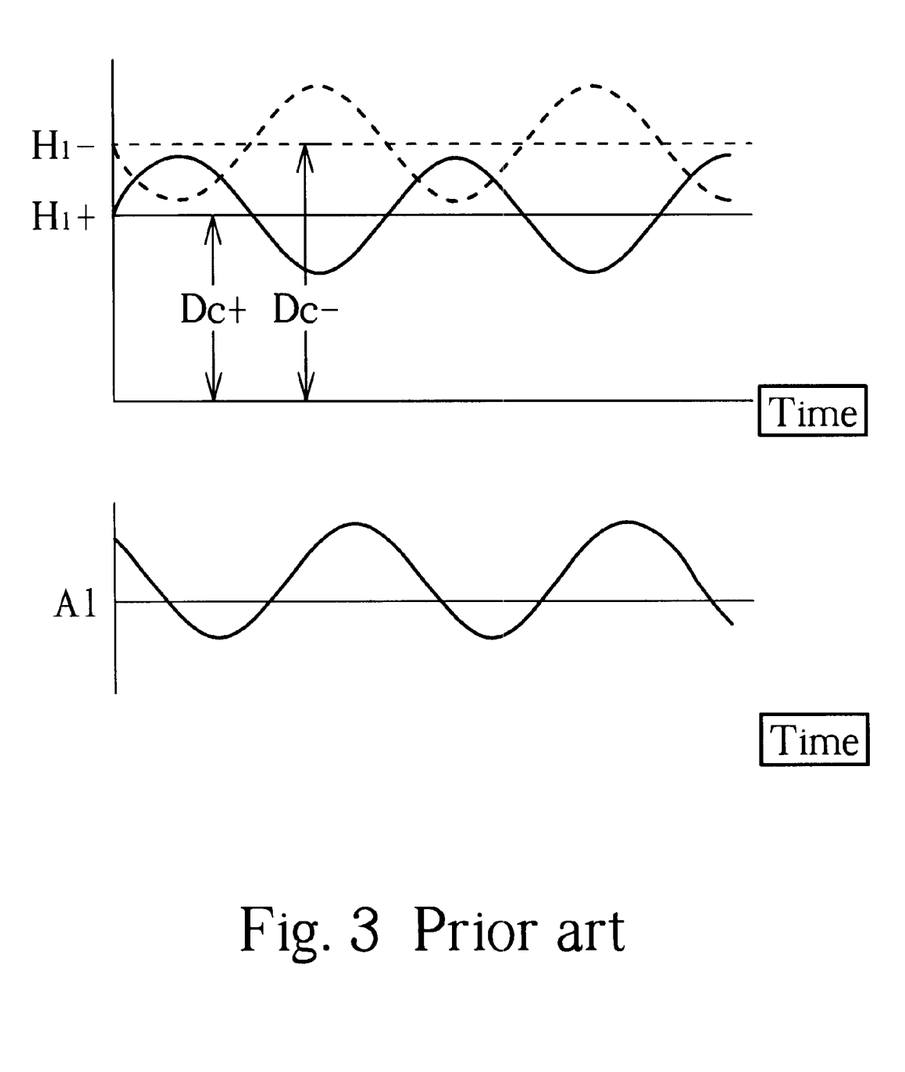
FIG. 3 is a realistic time sequence diagram of sensing signals and phase currents.

Please refer to FIG. 3. FIG. 3 is a realistic time sequence diagram of the sensing signals H1+, H1− and the phase current A1. Generally, the wave shape of the sensing signals does not match the ideal wave shape shown in FIG. 2. Due to inaccuracies of the ion-implantation process that is used to make the Hall sensors 16, or environmental effects such as temperature, the DC biases in the two sensing signals generated by the same Hall sensor 16 are not usually the same. For instance, the DC bias Dc+ in the sensing signal H1+ will probably be different from the DC bias Dc− in the sensing signal H1−. This differing bias will cause the motor driver 14 to generate the output phase current A1 with a DC bias. Likewise, the sensing signals H2+, H2+, and H3+, H3− with different DC biases will also cause the motor driver 14 to generate the output phase currents A2 and A3 with DC biases. As the output phase currents correspond to the torque of the motor, biased currents will generate an unbalance torque. As a result, the brushless motor 12 will not run smoothly.

SUMMARY OF THE INVENTION

It is therefore a primary objective of the present invention to provide a brushless motor system with capacitor devices to solve the above mentioned problem.

In a preferred embodiment, the present invention provides a brushless motor system comprising:

a brushless motor comprising a rotor;

at least one sensing circuit for detecting the rotor position, the sensing circuit comprising:
    a Hall sensor comprising two output ports; wherein as the rotor rotates, the Hall sensor will generate a sensing signal at each of the two output ports; and
    a capacitor device for each of the two output ports of the Hall sensor, the capacitor device connected in series with the output port; wherein the two capacitor devices are used to filter out DC biases in the two sensing signals; and a motor driver connected to the two capacitor devices for driving the rotor of the brushless motor according to the two sensing signals from the two capacitor devices.

It is an advantage of the present invention that the brushless motor system comprises the capacitor devices, which filter out the DC biases in the sensing signals, so that the brushless motor will run fast and smooth.

This and other objectives of the present invention will no doubt become obvious to those of ordinary skill in the art after having read the following detailed description of the preferred embodiment, which is illustrated in the various figures and drawings.

DETAILED DESCRIPTION OF THE PREFERRED EMBODIMENT

Figure 4:
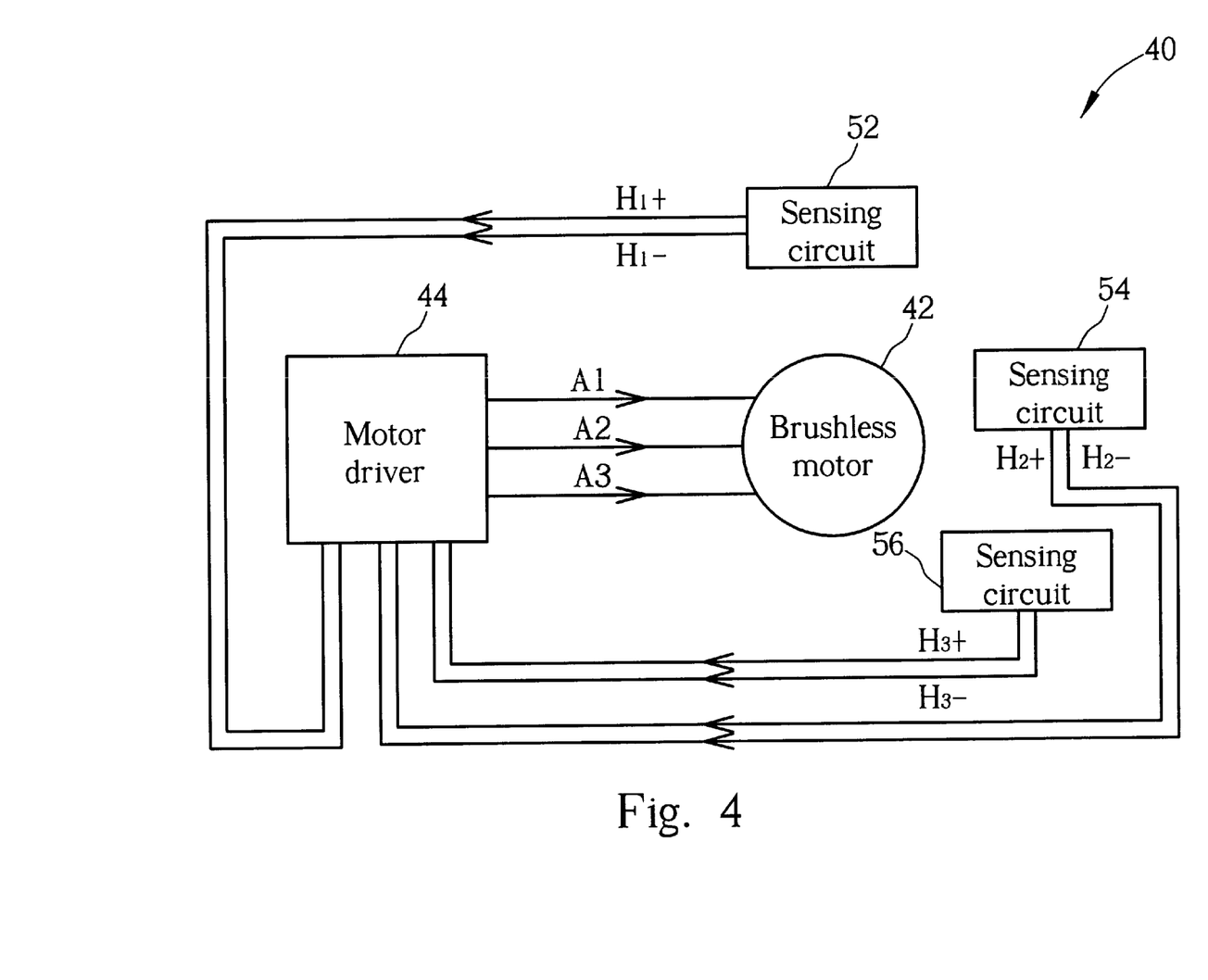
FIG. 4 is a schematic diagram of a brushless motor system according to the present invention.

Please refer to FIG. 4. FIG. 4 is a schematic diagram of a brushless motor system 40 according to the present invention. The brushless motor system 40 comprises a brushless motor 42, a motor driver 44, and three sensing circuits 52, 54, and 56. The brushless motor 42 comprises a rotor (not shown). The sensing circuits 52, 54, and 56 are used to detect the rotor position. The motor driver 44 is used to drive the rotor of the brushless motor 42 according to the rotor position detected by the sensing circuits 52, 54, and 56.

As shown in FIG. 4, as the rotor rotates, each of the sensing circuits 52, 54, and 56 will generate two corresponding sensing signals H1+, H1−, H2+, H2−, H3+, and H3−, and output them to the motor driver 44. The motor driver 44 will generate 3 phase currents A1, A2, and A3 and output them to the brushless motor 42 to drive the rotor according to the sensing signals H1+, H1−, H2+, H2−, H3+, and H3−.

Figure 5:
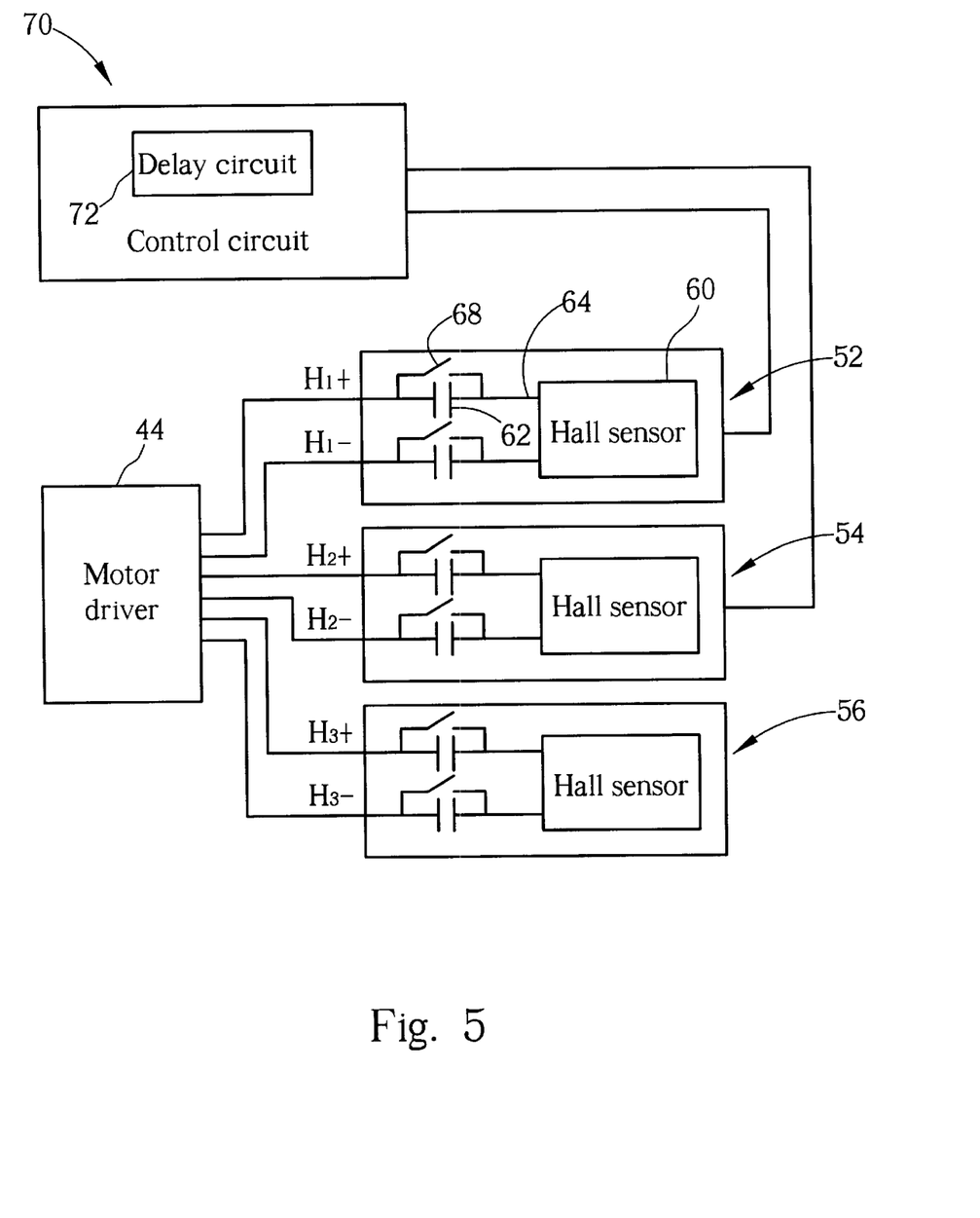
FIG. 5 is a schematic diagram of the sensing circuits shown in FIG. 4.

Please refer to FIG. 5. FIG. 5 is a schematic diagram of the sensing circuits 52, 54, and 56 shown in FIG. 4. Each of the sensing circuits 52, 54, and 56 comprises a Hall sensor 60 and two capacitor devices 62. Each of the Hall sensors 60 comprises two output ports 64, and each of the capacitor devices 62 is connected in series with one of the two output ports 64. That is to say that each output port 64 has a capacitor 62 connected to it in series. As the rotor rotates, each of the Hall sensors 60 will generate a corresponding sensing signal at each of its output ports 64. The motor driver 44 is connected to the capacitor devices 62 of the sensing circuits 52, 54, and 56, and drives the rotor according to the sensing signals H1+, H1−, H2+, H2−, H3+, and H3− from the capacitor devices 62 of the sensing circuits 52, 54, and 56. Because the capacitor devices 62 filter out DC biases in the sensing signals H1+, H1−, H2+, H2−, H3+, and H3−, those sensing signals that have different DC biases, as shown in FIG. 3, will be transformed into the ideal wave shapes shown in FIG. 2. Thus, the brushless motor 42 can run fast, but with less vibration.

As shown in FIG. 5, the sensing circuits 52, 54, and 56 each comprise two ON-OFF devices 68, and each ON-OFF device 68 is connected to each capacitor device 62 of the sensing circuit. In other words, each capacitor 62 has an associated ON-OFF device 68 connected to it in parallel. The brushless motor system 40 further comprises a control circuit 70 connected to the sensing circuits 52, 54, and 56 for controlling an ON-OFF state of the ON-OFF devices 68. When the state of an ON-OFF device 68 is ON, the sensing signal is sent to the motor driver 44 through the ON-OFF device 68. When the state of the ON-OFF device 68 is OFF, the sensing signal is sent to the motor driver 44 through the capacitor device 62. Hence, when the ON-OFF device is ON, an unfiltered signal is sent to the motor driver 44. However, when the ON-OFF device is OFF, an unbiased signal is sent to the motor driver 44.

The control circuit 70 comprises a control device for setting the state of all the ON-OFF devices 68 to OFF if the brushless motor 42 exceeds a predetermined rotational speed. For example, the control device may be a delay circuit 72. When the motor driver 44 begins to drive the brushless motor 42, the delay circuit 72 will set the state of all the ON-OFF devices 68 to ON. The sensing signals at the output ports 64 of the Hall sensors 60 are then sent to the motor driver 44 through the ON-OFF devices 68. After the motor driver 44 has driven the brushless motor 42 longer than a predetermined period of time, the delay circuit 72 will set the state of all the ON-OFF devices 68 to OFF. The sensing signals at the output ports 64 of the Hall sensors 60 will then be sent to the motor driver 44 through the capacitor devices 62. The predetermined time period is a time period that the brushless motor 42 exceeds the predetermined rotational speed.

When the brushless motor 42 starts up, the frequency of the sensing signals will be very low. These low-frequency sensing signals H1+, H1−, H2+, H2−, H3+, and H3− will not be able to pass through the capacitor devices 62 to the motor driver 44. Consequently, the ON-OFF devices 68 are used. When the state of the ON-OFF devices 68 is set to ON, the sensing signals H1+, H1−, H2+, H2−, H3+, and H3− can be sent to the motor driver 44 through the ON-OFF devices 68. Thus, the motor driver 44 will be able to generate the 3 phase currents A1, A2, and A3 according to the sensing signals H1+, H1−, H2+, H2−, H3+, and H3−. The 3 phase currents A1, A2, and A3 then drive the brushless motor 42 and get it rotating in the proper direction. After the predetermined time period, the rotational speed of the brushless motor 42 will be higher, as will be the corresponding frequency of the sensing signals. The control circuit 70 can then set the state of all the ON-OFF devices 68 to OFF, directing the sensing signals H1+, H1−, H2+, H2−, H3+, and H3− through the capacitor devices 62 to the motor driver 44. As mentioned above, because the capacitor devices 68 filter out DC biases in the sensing signals, the 3 phase currents A1, A2, A3 generated by the motor driver 44 are thus unbiased. The brushless motor 42 is more stable as a result.

The said ON-OFF devices 68 may be installed in only two of the three sensing circuits 52, 54, and 56. For example, only the sensing circuits 52, and 54 need comprise the ON-OFF devices 68. In this case, when the brushless motor 42 starts up, the sensing signals H3+, and H3− of the sensing circuit 56 will be filtered out by their capacitor devices 62, and will not reach the motor driver 44. However, the state of the ON-OFF devices 68 in the two sensing circuits 52 and 54 is initially set to ON. The sensing signals H1+, H1−, H2+, and H2− will reach the motor driver 44 through their ON-OFF devices 68. Thus, the motor driver 44 can generate 2 phase currents A1 and A2 according to the sensing signals H1+, H1−, H2+, and H2−. The 2 phase currents A1, and A2 are sufficient to start the brushless motor 42 and get it rotating in the correct direction. After the predetermined time period, the brushless motor 42 will have sped up, and so the frequency of the sensing signals will be higher. The higher frequency sensing signals H3+, and H3− will be able to pass through their respective capacitors 62, and 3 phase currents will begin to be delivered to the brushless motor 42. The control circuit 70 will set the state of all the ON-OFF devices 68 to OFF, whereupon all of the sensing signals H1+, H1−, H2+, H2−, H3+, and H3− are sent to the motor driver 44 through their capacitor devices 62. As mentioned above, because the capacitor devices 68 filter out the DC biases in the sensing signals, the 3 phase currents A1, A2, A3 generated by the motor driver 44 will have no DC biases. The brushless motor 42 is thus more stable.

Figure 6:
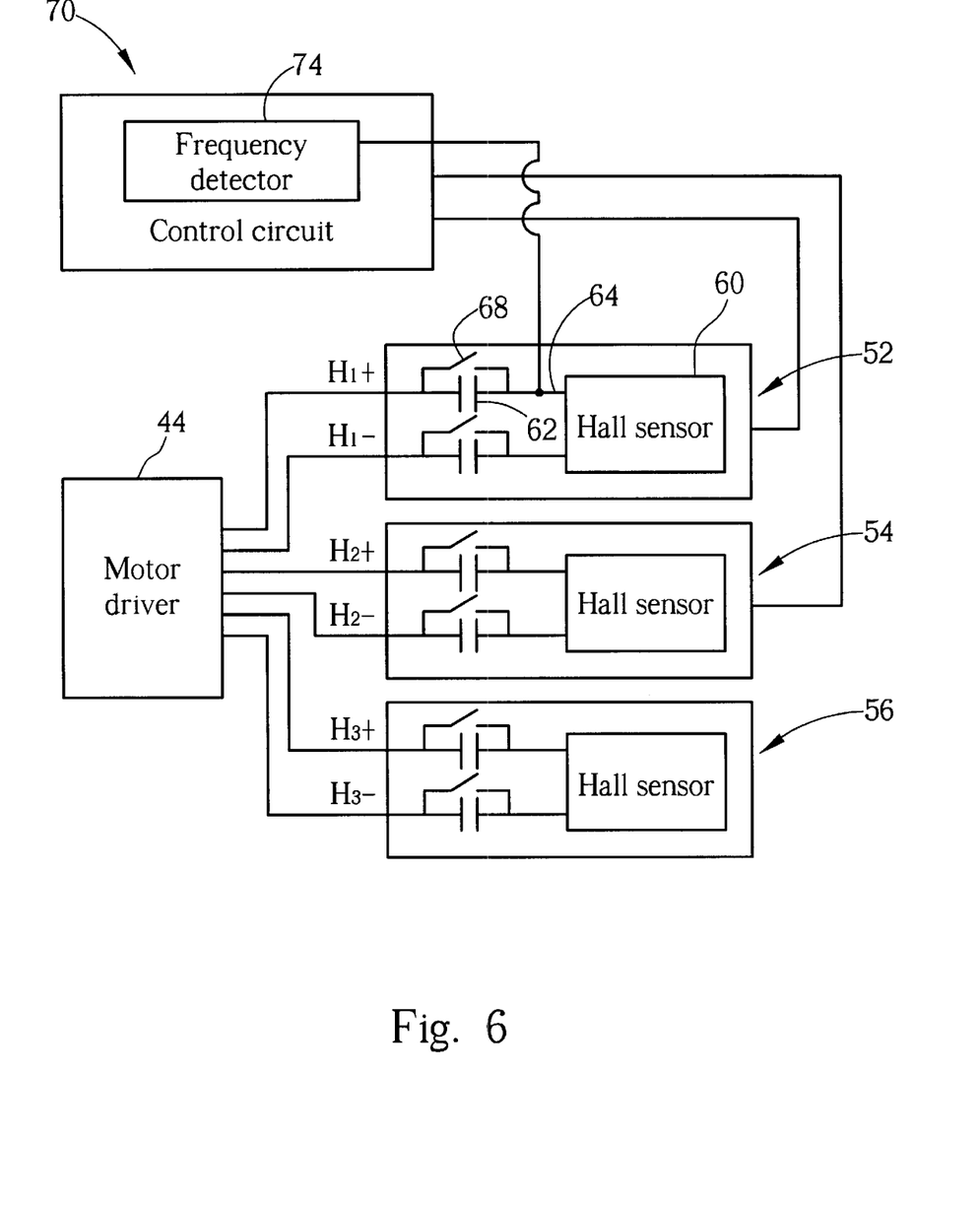
FIG. 6 is a schematic diagram of another embodiment of the brushless motor system shown in FIG. 4.

Please refer to FIG. 6. FIG. 6 is a schematic diagram of another embodiment of the brushless motor system 40 shown in FIG. 4. The delay circuit 72 of the control circuit 70 used in the brushless motor system 40 can be replaced by a frequency detector 74. The frequency detector 74 is electrically connected to the output port 64 of the Hall sensor 60 of the sensing circuit 52, and measures the frequency of the sensing signal at the output port 64. When the motor driver 44 begins to drive the brushless motor 42, the frequency detector 74 will set the state of all the ON-OFF devices 68 to ON, causing the sensing signals at the output ports 64 of the Hall sensors 60 to be sent to the motor driver 44 through their ON-OFF devices 68. When the frequency of the sensing signal detected by the frequency detector 74 exceeds a predetermined frequency, the frequency detector 74 will set the state of all the ON-OFF devices 68 to OFF, causing the sensing signals at the output ports 64 of the Hall sensors 60 to be sent to the motor driver 44 through their capacitor devices 62.

The frequency detector 74 is used to determine if the frequency of the sensing signals exceeds a predetermined frequency to ensure that the sensing signals can pass through their respective capacitor devices 62 after the ON-OFF devices 68 are set to OFF. Because the frequency of the sensing signals H1+, H1−, H2+, H2−, H3+, and H3− are all the same, the frequency detector 74 need only detect the sensing signal at one of the output ports 64.

The above embodiments are illustrated using a 3-phase brushless motor 42 with three sensing circuits 52, 54, 56 and 3 phase currents A1, A2, A3. The present invention, however, can clearly be scaled up to an any N-phase motor. For an N-phase motor driven by N phase currents with N sensing circuits, as long as each of the output ports 64 of the Hall sensors 60 are connected to a capacitor device 62, and at least two sensing circuits each comprise two ON-OFF devices 68, and each ON-OFF device 68 is connected to its associated capacitor device 62 of the sensing circuit (as shown in the above embodiments), the DC biases in the sensing signals can be completely filtered out, and the brushless motor 42 can be successfully started and will run smoothly.

Compared to the prior art brushless motor system 10, the brushless motor system 40 according to the present invention comprises the capacitor devices 62 and the ON-OFF devices 68. The capacitor devices 62 bring the wave shape of the sensing signals closer to the ideal wave shape, and make the brushless motor 42 run smoothly. The ON-OFF devices 68 help the brushless motor 42 to start. Combined, they create a highly stable brushless motor system 40.

Those skilled in the art will readily observe that numerous modifications and alternations of the device may be made while retaining the teachings of the invention. Accordingly, the above disclosure should by construed as limited only by the metes and bounds of the appended claims.

What is claimed is:

1. A brushless motor system comprising:
  a brushless motor having a rotor;
  a sensing circuit for detecting the rotor position, the sensing circuit having:
    a Hall sensor having two output ports; wherein as the rotor rotates, the Hall sensor will generate a sensing signal at each of the two output ports; and
    a capacitor device for each of the two output ports of the Hall sensor, the capacitor device connected in series with the output port;
  an ON-OFF device connected to the capacitor device;
  a control circuit for controlling an ON-OFF state of the ON-OFF devices; and
  a motor driver connected to the two capacitor devices for driving the rotor of the brushless motor according to the two sensing signals from the two capacitor devices;
  wherein when the state of an ON-OFF device is ON, the sensing signal is sent to the motor driver through the ON-OFF device; when the state of the ON-OFF device is OFF, the sensing signal is sent to the motor driver through the capacitor device.

2. The brushless motor system of claim 1 wherein the brushless motor is an N-phase motor, and the brushless motor system comprises N sensing circuits for detecting the rotor position, the motor driver of the brushless motor system being connected to the capacitor devices of the N sensing circuits and being used to drive the rotor of the brushless motor according to the sensing signals from the capacitor devices of the N sensing circuits.

3. The brushless motor system of claim 2 wherein the brushless motor is a 3-phase motor, and the brushless motor system comprises 3 sensing circuits for detecting the rotor position.

4. The brushless motor system of claim 1 wherein the control circuit comprises a control device; when the motor driver begins to drive the brushless motor, the control device will set the state of all the ON-OFF devices to ON to cause the sensing signals at the output ports of the Hall sensors to be sent to the motor driver through the ON-OFF devices; when the brushless motor is driven by the motor driver and exceeds a predetermined rotational speed, the control device will set the state of all the ON-OFF devices to OFF to cause the sensing signals at the output ports of the Hall sensors to be sent to the motor driver through the capacitor devices.

5. The brushless motor system of claim 4 wherein the control device is a delay circuit; when the motor driver begins to drive the brushless motor, the delay circuit will set the state of all the ON-OFF devices to ON to cause the sensing signals at the output ports of the Hall sensors to be sent to the motor driver through the ON-OFF devices; after the motor driver has driven the brushless motor longer than a predetermined time period, the delay circuit will set the state of all the ON-OFF devices to OFF to cause the sensing signals at the output ports of the Hall sensors to be sent to the motor driver through the capacitor devices.

6. The brushless motor system of claim 4 wherein the control device is a frequency detector for sensing at least one sensing signal from one of the output ports; when the motor driver begins to drive the brushless motor, the frequency detector will set the state of all the ON-OFF devices to ON to cause the sensing signals at the output ports of the Hall sensors to be sent to the motor driver through the ON-OFF devices; when the frequency detected by the frequency detector exceeds a predetermined frequency, the frequency detector will set the state of all the ON-OFF devices to OFF to cause the sensing signals at the output ports of the Hall sensors to be sent to the motor driver through the capacitor devices.

7. A motor driving system for driving a brushless motor with a rotor, the motor driving system comprising:
- a rotor position sensor generating an AC sensing signal corresponding to a position of the rotor;
- a capacitor device connected in series with the rotor position sensor;
- a switching device connected in parallel with the capacitor device;
- a control circuit controlling an ON-OFF status of the switching device; and
- a motor driver coupled to the capacitor device for driving the brushless motor;
- wherein the AC sensing signal is sent to the motor driver through the switching device when the switching device is ON, and the AC sensing signal is sent to the motor driver through the capacitor device when the switching device is OFF.

8. The brushless motor system of claim 7 wherein the control circuit sets the switching device in ON status when the rotational speed of the brushless motor is lower than a predetermined rotational speed, and the control circuit sets the switching device in OFF status when the rotational speed of the brushless motor exceeds the predetermined rotational speed.

9. The brushless motor system of claim 7 wherein the control circuit comprises a delay circuit; the delay circuit sets the switching device in ON status when the motor driver starts driving the brushless motor, and the delay circuit sets the switching device in OFF status when the motor driver has driven the brushless motor longer than a predetermined time period.

10. The brushless motor system of claim 7 wherein the control circuit comprises a frequency detector for detecting a frequency of the sensing signal; the frequency detector sets the switching device in ON status when the frequency detected by the frequency detector is lower than a predetermined frequency, and the frequency detector sets the switching device in OFF status when the frequency detected by the frequency detector exceeds the predetermined frequency.

11. The brushless motor system of claim 7 wherein the rotor position sensor is a Hall sensor.

\* \* \* \* \*